(12) United States Patent
Okumura et al.

(10) Patent No.: US 6,529,176 B1
(45) Date of Patent: Mar. 4, 2003

(54) IMAGE DISPLAY AND HORIZONTAL SPEED MODULATOR

(75) Inventors: Naoji Okumura, Minoo (JP); Hiroki Monta, Osaka (JP); Hideyo Uwabata, Takatsuki (JP); Yutaka Nio, Osaka (JP); Kazuto Tanaka, Otsu (JP); Yutaka Nishikawa, Kobe (JP)

(73) Assignee: Matsushita Electric Industrial Co., Ltd., Kadoma (JP)

( * ) Notice: Subject to any disclaimer, the term of this patent is extended or adjusted under 35 U.S.C. 154(b) by 0 days.

(21) Appl. No.: 09/673,361
(22) PCT Filed: Apr. 16, 1999
(86) PCT No.: PCT/JP99/02047
§ 371 (c)(1), (2), (4) Date: Oct. 16, 2000
(87) PCT Pub. No.: WO99/55084
PCT Pub. Date: Oct. 28, 1999

(30) Foreign Application Priority Data

Apr. 17, 1998 (JP) .............................. 11-107575
Mar. 24, 1999 (JP) .............................. 11-080601

(51) Int. Cl.$^7$ ................................. G09G 1/08
(52) U.S. Cl. ............................. 345/13; 345/23
(58) Field of Search ............................. 345/12, 13, 14, 345/23, 24, 25; 348/626, 806, 563–565; 315/371, 386, 391, 30

(56) References Cited

U.S. PATENT DOCUMENTS 5,072,300 A   12/1991   Anderson
5,663,615 A   9/1997    Ogino

FOREIGN PATENT DOCUMENTS

| JP | 61-69279  | 4/1986  |
| JP | 4-245786  | 9/1992  |
| JP | 5-122629  | 5/1993  |
| JP | 5-176328  | 7/1993  |
| JP | 6-205319  | 7/1994  |
| JP | 6-284309  | 10/1994 |
| JP | 8-172543  | 7/1996  |
| JP | 8-251439  | 9/1996  |

*Primary Examiner*—Regina Liang
(74) *Attorney, Agent, or Firm*—Armstrong, Westerman & Hattori, LLP

(57) ABSTRACT

A video signal processing circuit synthesizes a video signal and a graphic signal on the basis of a display switching control signal, inverts a synthesized signal on the time axis for each of a forward scanning period and a backward scanning period, and output a display signal. A speed modulating signal control circuit inverts the binarized display switching control signal on the time axis for each of the forward scanning period and the backward scanning period, expands the pulse width thereof, and feeds the display switching control signal to a speed modulating signal generating circuit. The speed modulating signal generating circuit subjects a display signal to first-order differentiation, inverts the polarity of a differentiated signal in the backward scanning signal, sets a portion, corresponding to the graphic signal, in the differentiated signal on the basis of the display switching control signal at a zero level, and generates a speed modulating signal.

25 Claims, 12 Drawing Sheets

F I G. 1
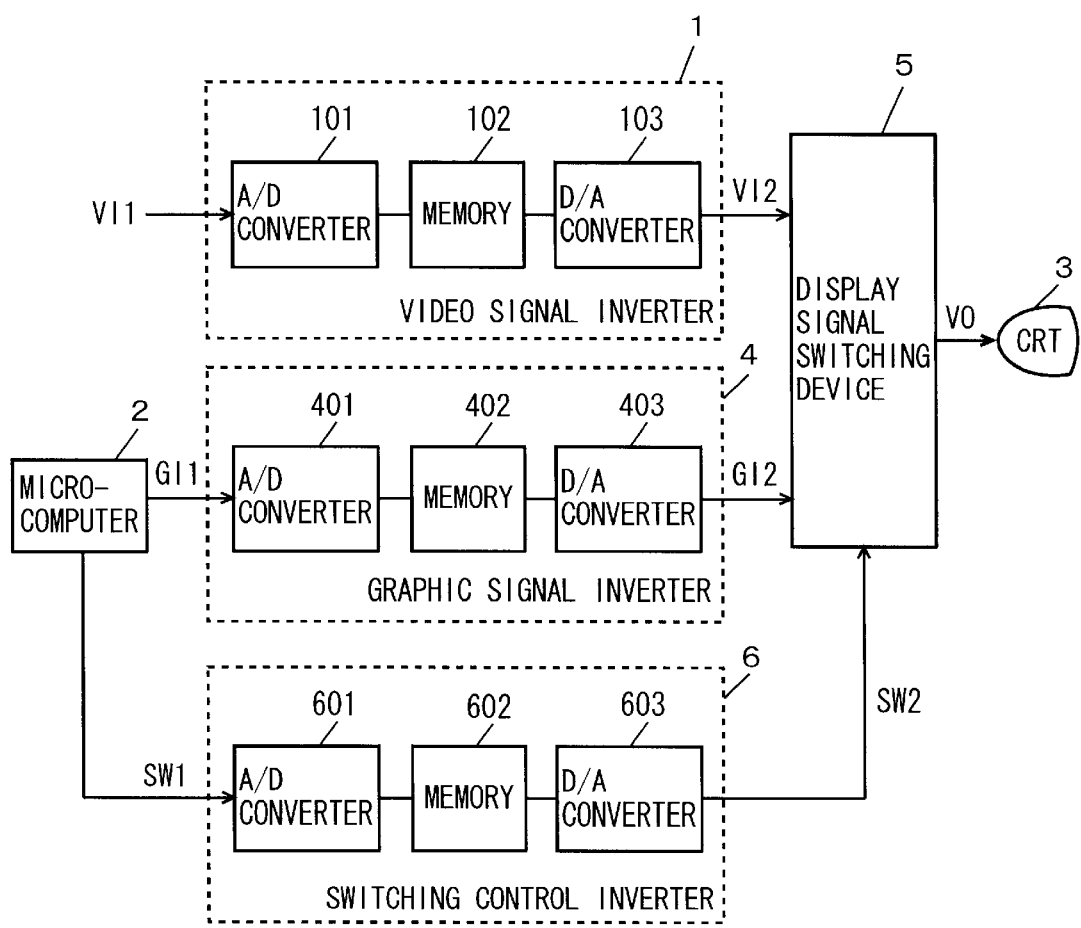

EXAMPLE OF DISPLAY IN
BIDIRECTIONAL SCANNING

DIAGRAM OF SYNCHRONOUS PHASE AT
THE TIME OF BIDIRECTIONAL SCANNING

EXAMPLE OF DISPLAY IN BIDIRECTIONAL SCANNING

DIAGRAM OF SYNCHRONOUS PHASE AT THE TIME OF BIDIRECTIONAL SCANNING

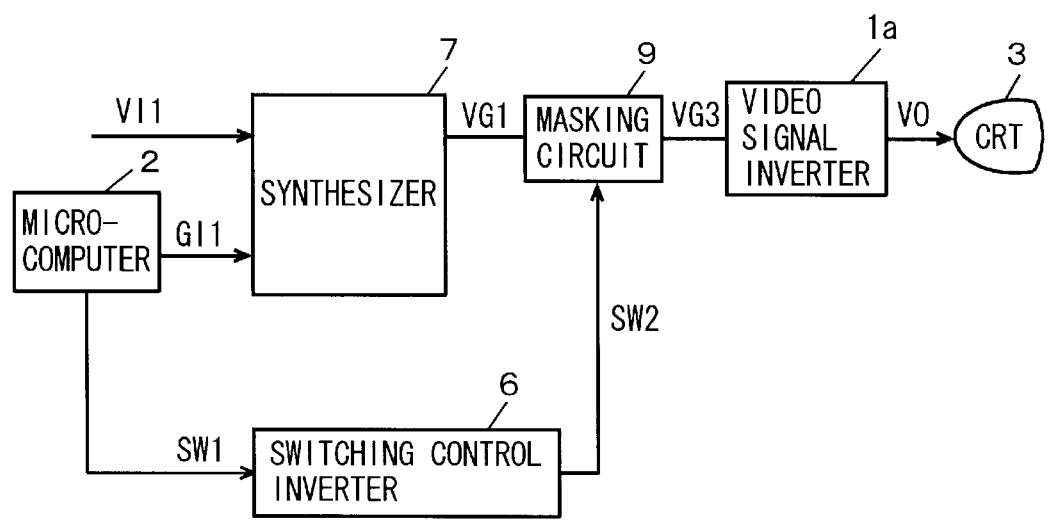
F I G. 6

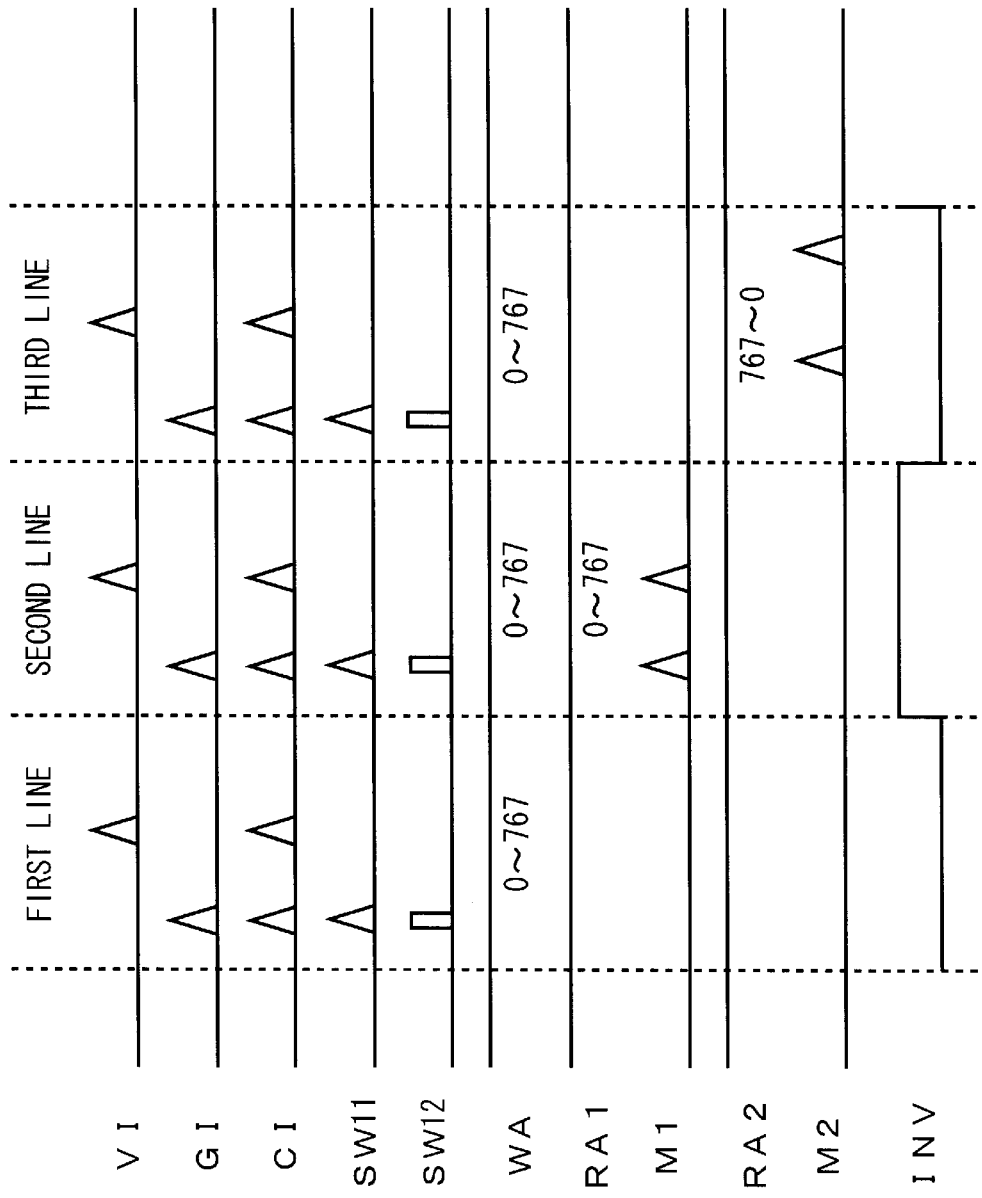

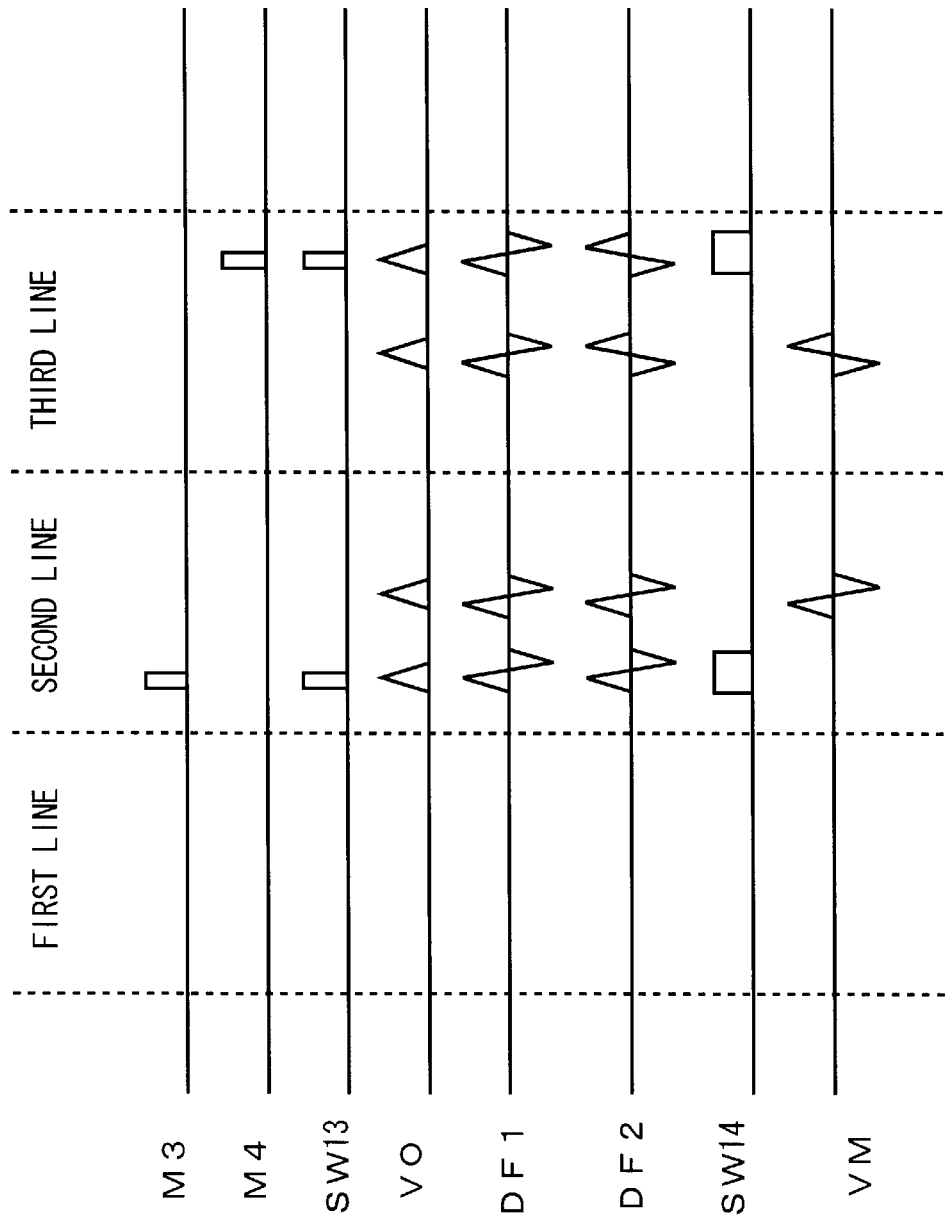

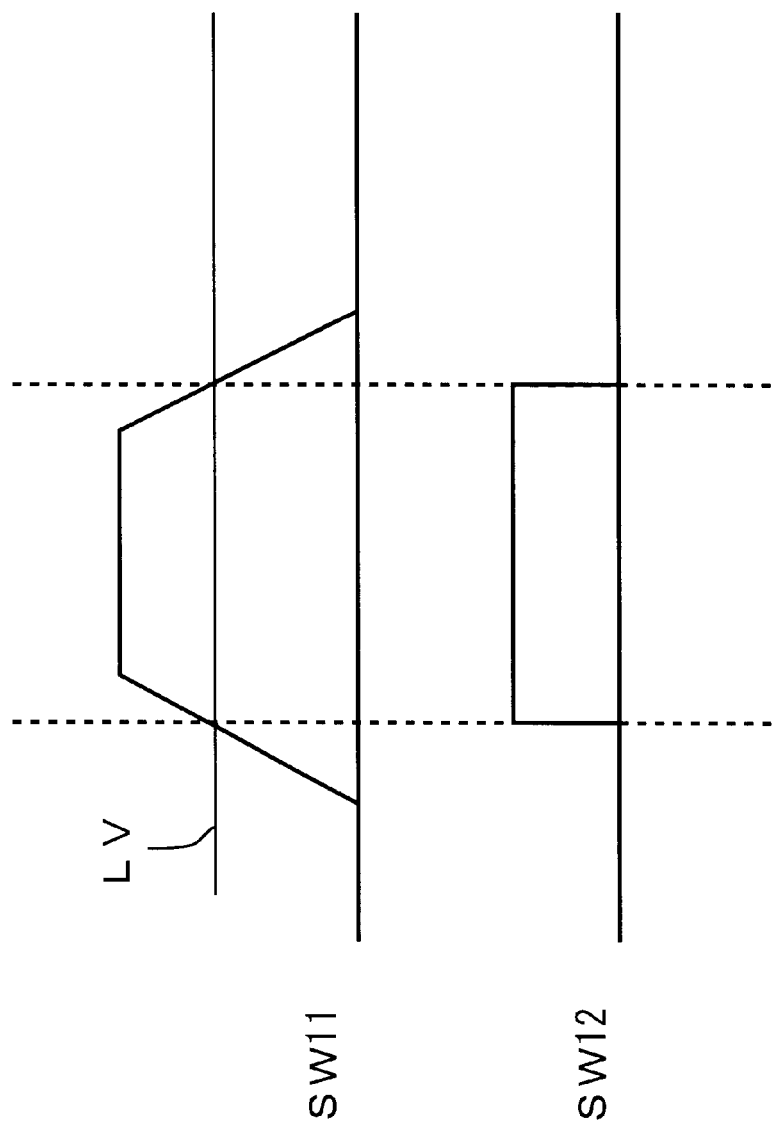

FIG.13a
PRIOR ART
EXAMPLE OF DISPLAY IN FORWARD SCANNING
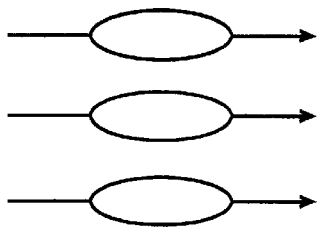
FIG.13b
PRIOR ART
DIAGRAM OF SYNCHRONOUS PHASE AT THE TIME OF FORWARD SCANNING
HORIZONTAL
SYNCHRONIZING
SIGNAL
VIDEO SIGNAL
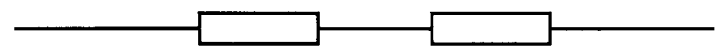
GRAPHIC SIGNAL
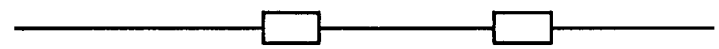
DISPLAY SWITCHING
CONTROL SIGNAL

IMAGE DISPLAY AND HORIZONTAL SPEED MODULATOR

TECHNICAL FIELD

The present invention relates to a horizontal bidirectional deflection system image display which is suitable for display of a highly precise image.

BACKGROUND ART

In recent years, digital techniques have been developed, and particularly the costs of large-capacity memories are reduced. The applications of image processing techniques using the memories have significantly progressed. In JP-A-8-172543, a bidirectional deflection system CRT (Cathode-Ray Tube) display has been proposed in order to reduce the power consumption at a high horizontal scanning frequency.

When the bidirectional deflection system CRT display which has been proposed in the prior art is put on the market as an actual image display such as a monitor apparatus for display or a television receiver, the function of graphically displaying set contents, channels, and the like by OSD (On Screen Display) is required.

FIG. 13(a) is a diagram showing an example of display of a video signal and an OSD graphic signal in conventional forward scanning, FIG. 13(b) is a diagram showing a phase relationship among a horizontal synchronizing signal, a video signal, a graphic signal (character signal), and a display switching control signal at the time of the forward scanning.

In FIG. 13(a), an ellipse on each of forward scanning lines L1, L2, and L3 indicates an on-screen display by the graphic signal. In FIG. 13(b), the video signal is outputted when the display switching control signal is at a low level, while the graphic signal is outputted when the display switching control signal is at a high level. Display by the video signal as well as on-screen display by the graphic signal are thus performed in each of forward scanning periods.

However, a technique for performing on-screen display in the bidirectional deflection system image display has not been established.

On the other hand, in the television receiver, a technique for enhancing the contour of an image using a method of horizontal speed modulation to improve focusing characteristics of a CRT has been widely employed. In JP-A-6-284309, the application of a speed modulation technique to a bidirectional deflection system has been proposed.

In the bidirectional deflection system image display, however, on-screen display and horizontal speed modulation are difficult to perform.

Therefore, it is desired to establish a technique making on-screen display possible in the bidirectional deflection system image display as well as to further establish a technique for performing horizontal speed modulation in the bidirectional deflection system image display capable of performing such on-screen display.

An object of the present invention is to provide a bidirectional deflection system image display capable of performing on-screen display.

Another object of the present invention is to provide a bidirectional deflection system image display capable of performing on-screen display and horizontal speed modulation.

Still another object of the present invention is to provide a horizontal speed modulator (horizontal velocity modulator) used for a bidirectional deflection system image display capable of performing on-screen display.

DISCLOSURE OF INVENTION

An image display according to an aspect of the present invention is an image display for displaying an image by forward scanning and backward scanning, comprising inverting means for inverting on the time axis a video signal and a graphic signal which correspond to the backward scanning; switching and outputting means for switching and outputting the video signal and the graphic signal which correspond to the forward scanning and switching and outputting the video signal and the graphic signal, which have been inverted, corresponding to the backward scanning; and display means for displaying the video signal and the graphic signal which have been outputted by the forward scanning and the backward scanning.

Therefore, the video signal and the graphic signal can be displayed by the forward scanning and the backward scanning. Consequently, a bidirectional deflection system image display capable of performing on-screen display is realized.

An image display according to another aspect of the present invention is an image display for displaying an image by forward scanning and backward scanning, comprising video signal inverting means for alternately inverting the output order of an inputted video signal between the forward scanning and the backward scanning; graphic signal generating means for generating a graphic signal; graphic signal inverting means for alternately inverting the output order of the graphic signal generated by the graphic signal generating means between the forward scanning and the backward scanning; display signal switching means for switching the display of the video signal outputted from the video signal inverting means and the graphic signal outputted from the graphic signal inverting means; switching and inverting means for alternately inverting the order of switching by the display signal switching means between the forward scanning and the backward scanning; and display means for displaying the video signal and the graphic signal which are outputted from the display signal switching means by the forward scanning and the backward scanning.

In the image display, the output order of the inputted video signal is alternately inverted between the forward scanning and the backward scanning, and the output order of the graphic signal is alternately inverted between the forward scanning and the backward scanning. The display of the video signal and the graphic signal is switched. In this case, the order of switching is alternately inverted between the forward scanning and the backward scanning. Therefore, the video signal and the graphic signal are displayed by the forward scanning and the backward scanning.

Consequently, a bidirectional deflection system image display capable of performing on-screen display is realized.

An image display according to still another aspect of the present invention is an image display for displaying an image by forward scanning and backward scanning, comprising synthesizing means for synthesizing a video signal and a graphic signal which correspond to the forward scanning and the backward scanning; inverting means for inverting on the time axis the video signal and the graphic signal, which have been synthesized, corresponding to the backward scanning; and display means for displaying by the forward scanning the video signal and the graphic signal, which have been synthesized, corresponding to the forward scanning, and displaying by the backward scanning the video signal and the graphic signal, which have been inverted, corresponding to the backward scanning.

Therefore, the video signal and the graphic signal can be displayed by the forward scannig and the backward scanning. Consequently, a bidirectional deflection system image display capable of performing on-screen display is realized.

An image display according to still another aspect of the present invention is an image display for displaying an image by forward scanning and backward scanning, comprising graphic signal generating means for generating a graphic signal; synthesizing means for synthesizing an inputted video signal and the graphic signal outputted from the graphic signal generating means; video signal inverting means for alternately inverting the output order of the video signal and the graphic signal which have been synthesized by the synthesizing means between the forward scanning and the backward scanning; and display means for displaying the video signal and the graphic signal which are outputted from the video signal inverting means by the forward scanning and the backward scanning.

In the image display, the video signal and the graphic signal which are inputted are synthesized. The output order of the video signal and the graphic signal which have been synthesized is alternately inverted between the forward scanning and the backward scanning.

Therefore, the video signal and the graphic signal are displayed by the forward scanning and the backward scanning. Consequently, a bidirectional deflection system image display capable of performing on-screen display is realized.

An image display according to still another aspect of the present invention is an image display for displaying an image by forward scanning and backward scanning, comprising inverting means for inverting on the time axis a video signal corresponding to the backward scanning; switching and outputting means for switching and outputting the video signal and the graphic signal which correspond to the forward scanning; masking means for masking a portion, corresponding to a displayed portion of the graphic signal in the upper or lower forward scanning, in the video signal corresponding to the backward scanning; and display means for displaying by the forward scanning the video signal and the graphic signal which correspond to the forward scanning, and displaying by the backward scanning the video signal, which has been partially masked, corresponding to the backward scanning.

Therefore, the video signal and the graphic signal are displayed by the forward scanning, and the video signal whose portion corresponding to the displayed portion of the graphic signal has been masked is displayed by the backward scanning. Consequently, a bidirectional deflection system image display capable of performing on-screen display only by the forward scanning is realized.

An image display according to still another aspect of the present invention is an image display for displaying an image by forward scanning and backward scanning, comprising video signal inverting means for alternately inverting the output order of an inputted video signal by the forward scanning and the backward scanning; graphic signal generating means for generating a graphic signal; display signal switching means for switching the display of the video signal outputted from the video signal inverting means and the graphic signal outputted from the graphic signal generating means as well as masking a portion, corresponding to a displayed portion of the graphic signal in the upper or lower forward scanning, in the video signal corresponding to the backward scanning with a mask signal generated by the graphic signal generating means; switching and inverting means for alternately inverting the order of switching by the display signal switching means between the forward scanning and the backward scanning; and display means for displaying by the forward scanning the video signal and the graphic signal which are outputted from the display signal switching means, and displaying by the backward scanning the video signal and the mask signal which are outputted from the display signal switching means.

In the image display, the output order of the inputted video signal is alternately inverted between the forward scanning and the backward scanning. Further, the display of the video signal and the graphic signal is switched, and the portion, corresponding to the displayed portion of the graphic signal in the upper or lower forward scanning, in the video signal corresponding to the backward scanning is masked with the mask signal. In this case, the order of switching is alternately inverted between the forward scanning and the backward scanning.

Therefore, the video signal and tie graphic signal are displayed by the forward scanning, and the video signal which has been partially masked is displayed by the backward scanning. Consequently, a bidirectional deflection system image display capable of performing on-screen display only by the forward scanning is realized.

An image display according to still another aspect of the present invention is an image display for displaying an image by forward scanning and backward scanning, comprising synthesizing means for synthesizing a video signal and a graphic signal which correspond to the forward scanning and the backward scanning; masking means for masking a portion, corresponding to a displayed portion of the graphic signal in the upper or lower forward scanning, in the video signal corresponding to the backward scanning; inverting means for inverting on the time axis the video signal, which has been partially masked, corresponding to the backward scanning; and display means for displaying by the forward scanning the video signal and the graphic signal which correspond to the forward scanning, and displaying by the backward scanning the video signal, which has been partially masked, corresponding to the backward scanning.

Therefore, the video signal and the graphic signal are displayed by the forward scanning, and the video signal whose portion corresponding to the displayed portion of the graphic signal has been masked is displayed by the backward scanning. Consequently, a bidirectional deflection system image display capable of performing on-screen display only by the forward scanning is realized.

An image display according to still another aspect of the present invention is an image display for displaying an image by forward scanning and backward scanning, comprising graphic signal generating means for generating a graphic signal; synthesizing means for synthesizing an inputted video signal and the graphic signal outputted from the graphic signal generating means; masking means receiving the video signal and the graphic signal which have been synthesized by the synthesizing means, and masking a portion, corresponding to a displayed portion of the graphic signal in the upper or lower forward scanning, in the video signal corresponding to the backward scanning and outputting the video signal and the graphic signal; video signal inverting means for alternately inverting the output order of the video signal and the graphic signal which are outputted from the masking means between the forward scanning and the backward scanning; and display means for displaying by the forward scanning the video signal and the graphic signal, corresponding to the forward scanning, which are outputted from the video signal inverting means, and displaying by the backward scanning the video signal, which has been partially masked, outputted from the video signal inverting means.

In the image display, the video signal and the graphic signal which are inputted are synthesized. Further, the portion, corresponding to the displayed portion of the graphic signal in the upper or lower forward scanning, in the video signal corresponding to the backward scanning is masked, to output the video signal and the graphic signal. The output order of the video signal and the graphic signal is alternately inverted between the forward scanning and the backward scanning.

Therefore, the video signal and the graphic signal are displayed by the forward scanning, and the video signal which has been partially masked is displayed by the backward scanning. Consequently, a bidirectional deflection system image display capable of performing on-screen display only by the forward scanning is realized.

An image display according to still another aspect of the present invention is an image display for displaying an image by forward scanning and backward scanning, comprising inverting means for alternately inverting the output order of a video signal and a graphic signal between the forward scanning and the backward scanning while synthesizing the video signal and the graphic signal; display means for displaying the video signal and the graphic signal which have been outputted by the forward scanning and the backward scanning; generating means for generating a horizontal speed modulating signal (horizontal velocity modulating signal) by differentiating the video signal and the graphic signal which have been outputted; and horizontal speed modulating means (horizontal velocity modulating means) for performing horizontal speed modulation (horizontal velocity modulation) on the basis of the generated horizontal speed modulating signal.

In the image display, the video signal and the graphic signal are displayed by the forward scanning and the backward scanning, and the video signal and the graphic signal are differentiated so that the horizontal speed modulating signal is generated. The horizontal speed modulation is performed on the basis of the generated horizontal speed modulation.

Consequently, a bidirectional deflection system image display capable of performing on-screen display and horizontal speed modulation is realized.

The image display may further comprise level control means for controlling a portion, corresponding to the graphic signal, in the horizontal speed modulating signal generated by the generating means at a predetermined level.

In this case, the portion, corresponding to the graphic signal, in the horizontal speed modulating signal, is controlled, thereby making it possible to prevent the image quality of a character portion which is on-screen displayed from being degraded.

An image display according to still another aspect of the present invention is an image display for displaying an image by forward scanning and backward scanning, comprising synthesizing and inverting means for alternately inverting the output order of the video signal and the graphic signal which are inputted between the forward scanning and the backward scanning while synthesizing the video signal and the graphic signal; display means for displaying the video signal and the graphic signal which are outputted from the synthesizing and inverting means by the forward scanning and the backward scanning; horizontal speed modulating signal generating means for differentiating the video signal and the graphic signal which are outputted from the synthesizing and inverting means to generate the horizontal signal modulating signal; and horizontal speed modulating means for performing horizontal speed modulation on the basis of the horizontal speed modulating signal outputted from a horizontal speed modulating signal generating means.

In the image display, the output order of the video signal and the graphic signal which are inputted is alternately inverted between the forward scanning and the backward scanning while the video signal and the graphic signal are being synthesized. The video signal and the graphic signal which have been synthesized are displayed by the forward scanning and the backward scanning. The video signal and the graphic signal which have been synthesized are differentiated so that the horizontal speed modulating signal is generated. The horizontal speed modulation is performed on the basis of the horizontal speed modulating signal.

Consequently, a bidirectional deflection system image display capable of performing on-screen display and horizontal speed modulation is realized.

The horizontal speed modulating signal generating means may comprise differentiating means for differentiating the video signal and the graphic signal which are outputted from the synthesizing and inverting means, and polarity inverting means for alternately inverting the polarity of an output signal of the differentiating means between the forward scanning and the backward scanning.

The image display may further comprise horizontal speed modulating signal control means for controlling a portion, corresponding to the graphic signal, in the horizontal speed modulating signal generated by the horizontal speed modulating signal generating means.

In this case, the portion, corresponding to the graphic signal, in the horizontal speed modulating signal is controlled, thereby making it possible to prevent the image quality of a character portion which is on-screen displayed from being degraded.

The horizontal speed modulating signal control means may set the portion, corresponding to the graphic signal, in the horizontal speed modulating signal generated by the horizontal speed modulating signal generating means at a predetermined level.

In this case, the portion, corresponding to the graphic signal, in the horizontal speed modulating signal is set at a predetermined level. Consequently, the contour of the character portion is not enhanced. As a result, the balance of the character portion which is on-screen displayed is maintained.

The synthesizing and inverting means may comprise first synthesizing means for switching and outputting the video signal and the graphic signal on the basis of a switching signal having a pulse corresponding to the position where the graphic signal is displayed, to synthesize the video signal and the graphic signal, and video signal inverting means for alternately inverting the output order of the video signal and the graphic signal which have been synthesized by the first synthesizing means between the forward scanning and the backward scanning. The horizontal speed modulating signal control means may comprise switching signal inverting means for alternately inverting the switching signal on the time axis between the forward scanning and the backward scanning, and control means for controlling a portion, corresponding to the graphic signal, in the horizontal speed modulating signal generated by the horizontal speed modulating signal generating means on the basis of the switching signal which has been inverted by the switching signal inverting means.

In this case, the video signal and the graphic signal are switched and outputted on the basis of the switching signal having the pulse corresponding to the position where the graphic signal is displayed, so that the video signal and the graphic signal are synthesized. The output order of the video signal and the graphic signal which have been synthesized is alternately inverted between the forward scanning and the backward scanning. The, switching signal is alternately inverted on the time axis between the forward scanning and the backward scanning. Further, the portion, corresponding to the graphic signal, in the horizontal speed modulating signal is controlled on the basis of the inverted switching signal.

The horizontal speed modulating signal control means may further comprise pulse width expanding means for expanding the width of the pulse of the switching signal which has been inverted by the switching signal inverting means.

In this case, the width of the pulse of the switching signal is expanded, thereby making it possible to reliably control the portion, corresponding to the graphic signal, in the horizontal speed modulating signal.

The pulse width expanding means may control the amount of expansion of the width of the pulse of the switching signal depending on the frequency band of the horizontal speed modulating signal generated by the horizontal speed modulating signal generating means.

In this case, the amount of expansion of the width of the pulse of the switching signal is controlled depending on the frequency band of the horizontal speed modulating signal. Accordingly, the portion, corresponding to the graphic signal, in the horizontal speed modulating signal can be reliably controlled depending on the frequency band of the horizontal speed modulating signal.

The image display may further comprise binarizing means for binarizing the switching signal and feeding the binarized switching signal to the switching signal inverting means.

In this case, the switching signal is binarized. On the basis of the binarized switching signal, the display of the video signal and the graphic signal is switched, and the horizontal speed modulating signal is controlled.

The video signal inverting means may comprise first storing means for inputting and storing the video signal and the graphic signal, corresponding to the forward scanning, which have been outputted from the first synthesizing means as well as outputting the video signal and the graphic signal which have been stored in the same order as that at the time of the input, second storing means for inputting in a predetermined order and storing the video signal and the graphic signal, corresponding to the backward scanning, which have been outputted from the first synthesizing means as well as outputting the video signal and the graphic signal which have been stored in an order reverse to that at the time of the input, and second synthesizing means for synthesizing the video signal and the graphic signal which are outputted from the first storing means and the video signal and the graphic signal which are outputted from the second storing means. The switching signal inverting means may comprise third storing means for inputting in a predetermined order and storing the switching signal corresponding to the forward scanning as well as outputting the stored switching signal in the same order as that at the time of the input, fourth storing means for inputting in a predetermined order and storing the switching signal corresponding to the backward scanning as well as outputting the stored switching signal in an order reverse to that at the time of the input, and third synthesizing means for synthesizing the switching signal outputted from the third storing means and the switching signal outputted from the fourth storing means.

In this case, the video signal and the graphic signal, corresponding to the forward scanning, which have been synthesized are inputted to the first storing means in a predetermined order and stored therein, and the video signal and the graphic signal which have been stored in the first storing means are outputted in the same order as that at the time of the input. Further, the video signal and the graphic signal, corresponding to the forward scanning, which have been synthesized are inputted to the second storing means in a predetermined order and stored therein, and the video signal and the graphic signal which have been stored in the second storing means are outputted in an order reverse to that at the time of the input. The video signal and the graphic signal which are outputted from the first storing means and the video signal and the graphic signal which are outputted from the second storing means are synthesized. The output order of the video signal and the graphic signal is thus alternately inverted between the forward scanning and the backward scanning.

On the other hand, the switching signal corresponding to the forward scanning is inputted to the third storing means in a predetermined order and stored therein, and the switching signal which has been stored in the third storing means is outputted in the same order as that at the time of the input. Further, the switching signal corresponding to the backward scanning is inputted to the fourth storing means in a predetermined order and stored therein, and the switching signal which has been stored in the fourth storing means is outputted in an order reverse to that at the time of the input. The switching signal outputted from the third storing means and the switching signal outputted from the fourth storing means are synthesized. The switching signal is thus alternately inverted on the time axis between the forward scanning and the backward scanning.

The image display may further comprise format converting means for converting the format of the inputted graphic signal into the format of the inputted video signal.

In this case, the format of the inputted graphic signal is converted into the format of the inputted video signal, so that the signals are synthesized.

A horizontal speed modulator (horizontal velocity modulator) according to still another aspect of the present invention is a horizontal speed modulator used for an image display for displaying an image by forward scanning and backward scanning, comprising synthesizing and inverting means for alternately inverting the output order of a video signal and a graphic signal which are inputted between the forward scanning and the backward scanning while synthesizing the video signal and the graphic signal; horizontal speed modulating signal generating means for differentiating the video signal and the graphic signal which are outputted from the synthesizing and inverting meals, to generate a horizontal speed modulating signal; horizontal speed modulating means for performing horizontal speed modulation on the basis of the horizontal speed modulating signal outputted from the horizontal speed modulating signal generating means; and horizontal speed modulating signal control means for controlling a portion, corresponding to the graphic signal, in the horizontal speed modulating signal generated by the horizontal speed modulating signal generating means.

In the horizontal speed modulator, the output order of the video signal and the graphic signal which are inputted is alternately inverted between the forward scanning and the backward scanning while the video signal and the graphic signal are being synthesized. The video signal and the graphic signal which have been synthesized are differentiated so that the horizontal speed modulating signal is generated. The horizontal speed modulation is performed on the basis of the horizontal speed modulating signal.

In this case, the portion, corresponding to the graphic signal, in the horizontal speed modulating signal is controlled, thereby making it possible to prevent the image quality of the character portion which is on-screen displayed from being degraded.

The horizontal speed modulating signal generating means may comprise differentiating means for differentiating the video signal and the graphic signal which are outputted from the synthesizing and inverting means, and polarity inverting means for alternately inverting the polarity of an output signal of the differentiating means between the forward scanning and the backward scanning.

The horizontal speed modulating signal control means may set the portion, corresponding to the graphic signal, in the horizontal speed modulating signal generated by the horizontal speed modulating signal generating means at a predetermined level.

In this case, the portion, corresponding to the graphic signal, in the horizontal speed modulating signal is set at a predetermined level. Consequently, the contour of the character portion is not enhanced. As a result, the balance of the character portion which is on-screen displayed is maintained.

The synthesizing and inverting means may comprise synthesizing means for switching and outputting the video signal and the graphic signal on the basis of a switching signal having a pulse corresponding to the position where the graphic signal is displayed, to synthesize the video signal and the graphic signal, and video signal inverting means for alternately inverting the output order of the video signal and the graphic signal which have been synthesized by the synthesizing means between the forward scanning and the backward scanning. The horizontal speed modulating signal control means may comprise switching signal inverting means for alternately inverting the switching signal on the time axis between the forward scanning and the backward scanning, and control means for controlling a portion, corresponding to the graphic signal, in the horizontal speed modulating signal generated by the horizontal speed modulating signal generating means on the basis of the switching signal which has been inverted by the switching signal inverting means.

In this case, the video signal and the graphic signal are switched and outputted on the basis of the switching signal having the pulse corresponding to the position where the graphic signal is displayed, so that the video signal and the graphic signal are synthesized. The output order of the video signal and the graphic signal which have been synthesized is alternately inverted between the forward scanning and the backward scanning. The switching signal is alternately inverted on the time axis between the forward scanning and the backward scanning. Further, the portion, corresponding to the graphic signal, in the horizontal speed modulating signal is controlled on the basis of the inverted switching signal.

The horizontal speed modulating signal control means may further comprise pulse width expanding means for expanding the width of the pulse of the switching signal which has been inverted by the switching signal inverting means.

In this case, the width of the pulse of the switching signal is expanded, thereby making it possible to reliably control the portion, corresponding to the graphic signal, in the horizontal speed modulating signal.

As described in the foregoing, according to the present invention, a bidirectional deflection system image display capable of performing on-screen display is realized. Further, there is provided a bidirectional deflection system image display capable of performing on-screen display and horizontal speed modulation. Particularly, the portion, corresponding to the graphic signal, in the horizontal speed modulating signal is controlled, thereby making it possible to prevent the image quality of the character portion which is on-screen displayed from being degraded.

BRIEF DESCRIPTION OF DRAWINGS

FIG. 1 is a block diagram showing the configuration of a principal part of an image display according to a first embodiment of the present invention.

FIG. 6 is a block diagram showing the configuration of a principal part of an image display according to a fourth embodiment of the present invention.

FIG. 10 is a waveform diagram for explaining the operation of the image display shown in FIG. 8.

FIG. 11 is a waveform diagram for explaining the operation of the image display shown in FIG. 8.

FIG. 12 is a waveform diagram for explaining the operation of a second converting circuit shown in FIG. 8.

FIG. 13 is a diagram showing an example of display of a video signal and an OSD graphic signal in conventional bidirectional scanning and a phase relationship among a horizontal synchronizing signal, a video signal, a graphic signal, and a display switching control signal at the time of bidirectional scanning.

BEST MODE FOR CARRYING OUT THE INVENTION

(1) First Embodiment

Figure 2A:
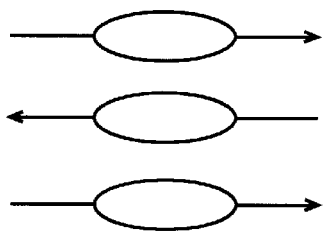
FIG. 2 is a diagram showing an example of display of a video signal and an OSD graphic signal in bidirectional scanning and a phase relationship among a horizontal synchronizing signal, a video signal, a graphic signal, and a display switching control signal at the time of bidirectional scanning.

FIG. 1 is a block diagram showing the configuration of a principal part of an image display according to a first embodiment of the present invention.

The image display shown in FIG. 1 comprises a video signal inverter 1, a microcomputer 2, a CRT (Cathode-Ray Tube) 3, a graphic signal inverter 4, a display signal switching device 5, and a switching control inverter 6.

The video signal inverter 1 comprises an A/D (Analog-to-Digital) converter 101, a memory 102, and a D/A (Digital-to-Analog Converter) 103. The graphic signal inverter 4 comprises an A/D converter 401, a memory 402, and a D/A converter 403. The switching control inverter 6 comprises an A/D converter 601, a memory 602, and a D/A converter 603.

In the video signal inverter 1, the A/D converter 101 converts an analog video signal (image signal) VI1 fed from the exterior into a digital video signal. The digital video signal obtained by the A/D converter 101 is written into the memory 102 in a predetermined order and temporarily stored therein.

The video signal in a forward scanning period which has been stored in the memory 102 is read out in the same order as that at the time of the writing. On the other hand, the video signal in a backward scanning period which has been stored in the memory 102 is read out in an order reverse to that at the time of the writing. The D/A converter 103 converts the digital video signal which has been read out of the memory 102 into an analog video signal VI2 and outputs the analog video signal VI2.

The output order of the video signal is thus inverted between the forward scanning period and the backward scanning period by the video signal inverter 1.

The microcomputer 2 generates a video signal as well as a graphic signal (character signal) GI1 for performing on-screen display, and outputs a display switching control signal SW1. In the graphic signal inverter 4, the A/D converter 401 converts the analog graphic signal GI1 outputted from the microcomputer 2 into a digital graphic signal. The digital graphic signal which has been obtained by the A/D converter 401 is written into the memory 402 in a predetermined order, and is temporarily stored therein.

The graphic signal in the forward scanning period which has been stored in the memory 402 is readout in the same order as that at the time of the writing. The graphic signal in the backward scanning period which has been stored in the memory 402 is read out in an order reverse to that at the time of the writing. The D/A converter 403 converts the digital graphic signal which has been read out of the memory 402 into an analog graphic signal GI2 and output is the analog graphic signal GI2.

The output order of the graphic signal is inverted between the forward scanning period and the backward scanning period by the graphic signal inverter 4.

In the display switching control device 6, the A/D converter 601 converts the analog display switching control signal SW1 outputted from the microcomputer 2 into a digital display switching control signal. The display switching control signal obtained by the A/D converter 601 is written into the memory 602 in a predetermined order, and is temporarily stored therein.

The display switching control signal in the forward scanning period which has been stored in the memory 602 is read out in the same order as that at the time of the writing. The display switching control signal in the backward scanning period which has been stored in the memory 602 is read out in an order reverse to that at the time of the writing. The D/A converter 603 converts the digital switching control signal which has been read out of the memory 602 into an analog display switching control signal SW2, and outputs the analog display switching control signal SW2.

The output order of the display switching control signal is inverted between the forward scanning period and the backward scanning period by the switching control inverter 6.

The display signal switching device 5 switches the video signal VI2 outputted from the video signal inverter 1 and the graphic signal GI2 outputted from the graphic signal inverter 4 on the basis of the display switching control signal SW2 outputted from the switching control inverter 6, and outputs a display signal VO. The CRT 3 displays the display signal VO outputted from the display signal switching device 5.

In the present embodiment, the video signal inverter 1 corresponds to video signal inverting means, the microcomputer 2 corresponds to graphic signal generating means, the graphic signal inverter 4 corresponds to graphic signal inverting means, the display signal switching device 5 corresponds to display signal switching means, the switching control inverter 6 corresponds to switching and inverting means, and the CRT 3 corresponds to display means.

Figure 2B:
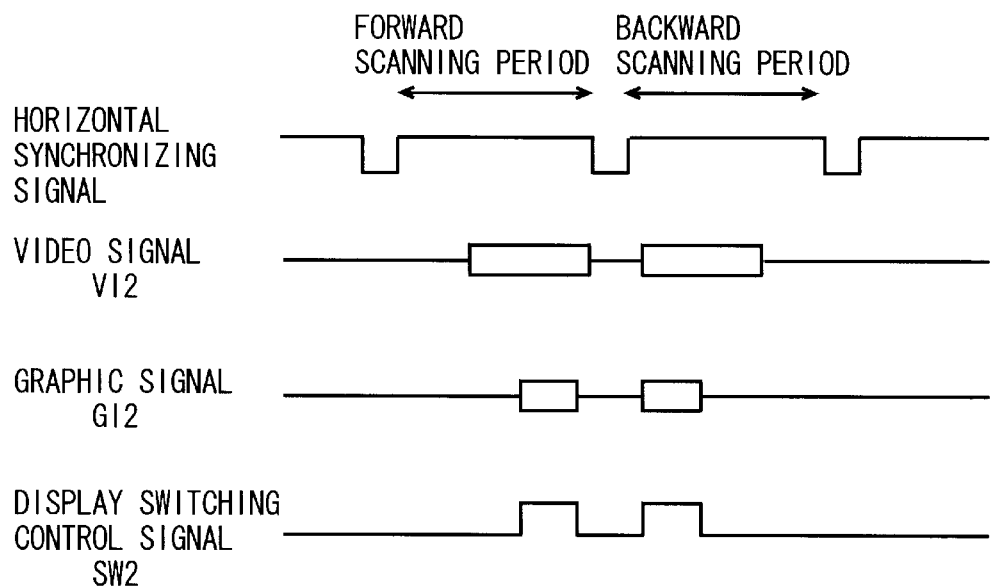

FIG. 2(a) is a diagram showing an example of display of a video signal and an OSD graphic signal in bidirectional scanning, and FIG. 2(b) is a diagram showing a phase relationship among a horizontal synchronizing signal, a video signal, a graphic signal, and a display switching control signal at the time of the bidirectional scanning.

In FIG. 2(a), an ellipse on each of forward scanning lines L1 and L3 and a backward scanning line L2 indicates an on-screen display by the graphic signal.

In FIG. 2(b), in the forward scanning period, the video signal VI2, the graphic signal GI2, and the display switching control signal SW2 are not inverted on the time axis. In the backward scanning period, the video signal VI2, the graphic signal GI2, and the display switching control signal SW2 are inverted on the time axis.

The video signal VI2 is outputted when the display switching control signal SW2 is at a low level, while the graphic signal GI2 is outputted when the display switching control signal SW2 is at a high level. Display by the video signal VI2 as well as on-screen display by the graphic signal GI2 are thus performed in the forward scanning period and the backward scanning period.

According to the image display shown in FIG. 1, the on-screen display is possible in the display of the video signal by bidirectional deflection. An image display such as a television receiver or a monitor apparatus for display which comprises the function of on-screen displaying set contents and channels is realized.

(2) Second Embodiment

Figure 3:
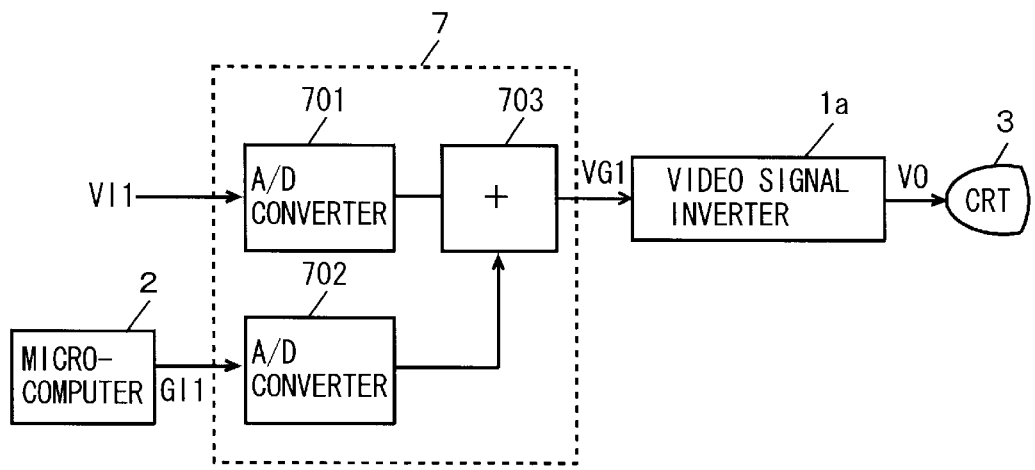
FIG. 3 is a block diagram showing the configuration of a principal part of an image display according to a second embodiment of the present invention.

FIG. 3 is a block diagram showing the configuration of a principal part of an image display according to a second embodiment of the present invention.

The image display shown in FIG. 3 comprises a video signal inverter 1a, a microcomputer 2, a CRT 3, and a synthesizer 7. The operations of the microcomputer 2 and the CRT 3 shown in FIG. 3 are the same as the operations of the microcomputer 2 and the CRT 3 shown in FIG. 1.

The video signal inverter 1a comprises the memory 102 and the D/A converter 103 in the image display inverter 1 shown in FIG. 1. The synthesizer 7 comprises A/D converters 701 and 702 and a synthesizing circuit 703.

In the synthesizer 7, the A/D converter 701 converts an analog video signal VI1 fed from the exterior into a digital video signal. The A/D converter 702 converts an analog graphic signal GI1 outputted from the microcomputer 2 into a digital graphic signal. The synthesizing circuit 703 performs synthesis processing for replacing the digital video signal outputted from the A/D converter 701 with the digital graphic signal outputted from the A/D converter 702 when the graphic signal GI1 is outputted from the microcomputer 2, and outputs a synthesized signal VG1.

The video signal inverter 1a outputs the synthesized signal VG1 in a forward scanning period which is outputted from the synthesizer 7 as it is as a display signal VO, while inverting the synthesized signal VG1 in a backward scanning period on the time axis and outputting the inverted synthesized signal VG1 as a display signal VO. The CRT 3 displays the display signal VO outputted from the video signal inverter 1a.

In the present embodiment, the microcomputer 2 corresponds to graphic signal generating means, the synthesizer 7 corresponds to synthesizing means, the video signal inverter 1a corresponds to video signal inverting means, and the CRT 3 corresponds to display means.

In the image display shown in FIG. 3, since the graphic signal which has been synthesized with a video signal in the synthesizer 7 can be thereafter processed as a video signal, the synthesized signal VG1 in the backward scanning period is inverted on the time axis by the video signal inverter 1a, as in the image display shown in FIG. 1, thereby obtaining the same result of processing as that in the image display shown in FIG. 1.

(3) Third Embodiment

Figure 4:
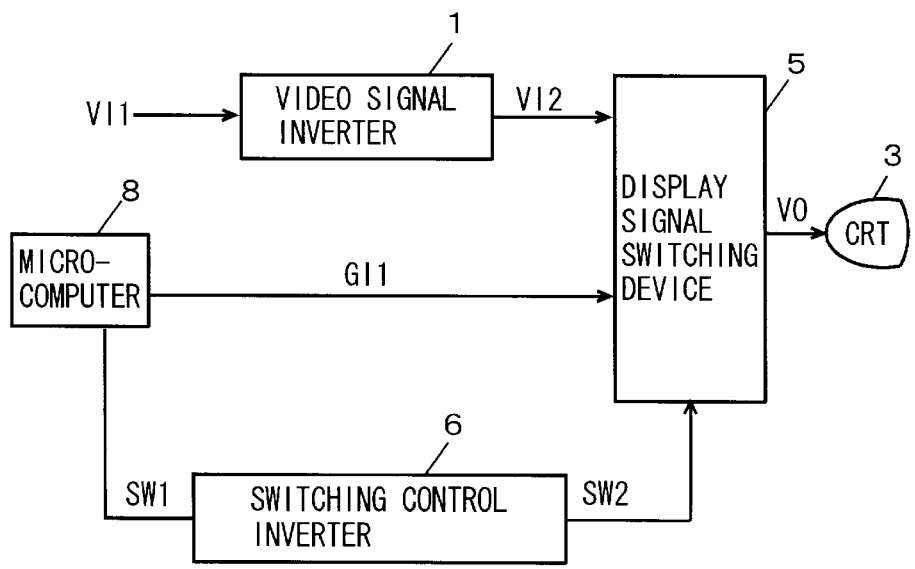
FIG. 4 is a block diagram showing the configuration of a principal part of an image display according to a third embodiment of the present invention.

FIG. 4 is a block diagram showing the configuration of a principal part of an image display in a third embodiment of the present invention.

The image display shown in FIG. 4 comprises a video signal inverter 1, a CRT 3, a display signal switching device 5, a switching control inverter 6, and a microcomputer 8. The configurations and the operations of the video signal inverter 1, the CRT 3, the display signal switching device 5, and the switching control inverter 6 shown in FIG. 4 are the same as the configurations and the operations of the video signal inverter 1, the CRT 3, the display signal switching device 5, and the switching control inverter 6 shown in FIG. 1.

Although the configuration of the microcomputer 8 shown in FIG. 4 is the same as the configuration of the microcomputer 2 shown in FIG. 1, the microcomputer 8 shown in FIG. 4 outputs a mask signal for masking a video signal VI2 in place of a graphic signal GI1 when on-screen display by a graphic signal is not performed. In the present embodiment, the mask signal is a signal at a black level.

In the present embodiment, the video signal inverter 1 corresponds to video signal inverting means, the microcomputer 8 corresponds to graphic signal generating means, the display signal switching device 5 corresponds to display signal switching means, the switching control inverter 6 corresponds to switching and inverting means, and the CRT 3 corresponds to display means.

Figure 5A:
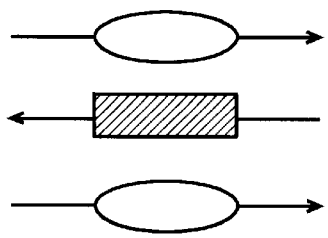
FIG. 5 is a diagram showing an example of display of a video signal and an OSD graphic signal in bidirectional scanning and a phase relationship among a horizontal synchronizing signal, a video signal, a graphic signal, and a display switching control signal at the time of bidirectional scanning.
Figure 5B:
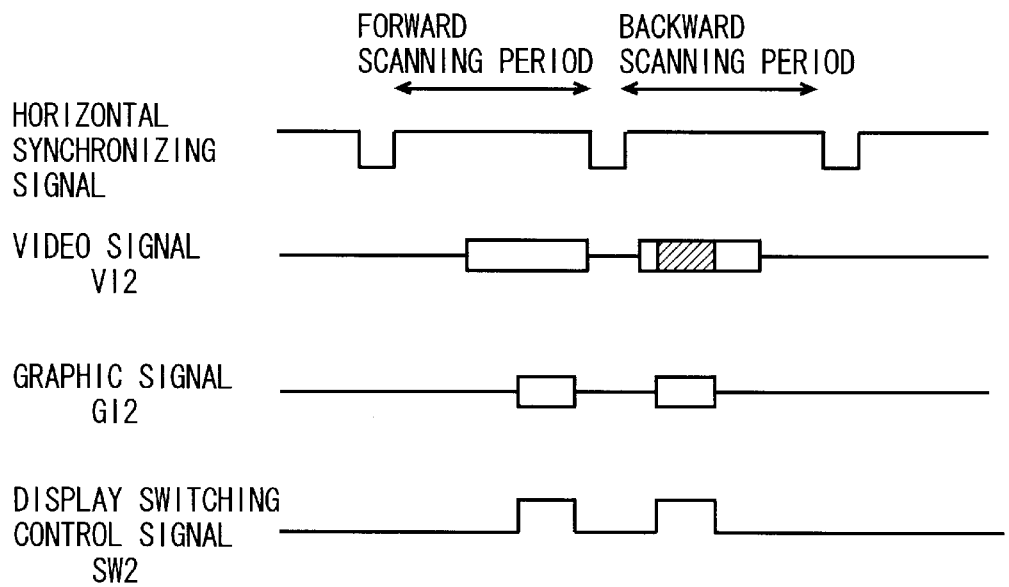

FIG. 5(a) is a diagram showing an example of display of a video signal and an OSD graphic signal in bidirectional scanning. FIG. 5(b) is a diagram showing a phase relationship among a horizontal synchronizing signal, a video signal, a graphic signal, and a display switching control signal at the time of bidirectional scanning.

In FIG. 5(a), an ellipse on each of forward scanning lines L1 and L3 indicates an on-screen display by the graphic signal. In a part of a backward scanning line L2 where the upper and lower forward scanning lines L1 and L3 are on-screen displayed, the signal at a black level which is outputted from the microcomputer 8 is displayed.

In FIG. 5(b), in a forward scanning period, a video signal VI2, a graphic signal GI2, and a display switching control signal SW2 are not inverted on the time axis. In the forward scanning period, the video signal VI2, the graphic signal GI2, and the display switching control signal SW2 are inverted on the time axis.

In the forward scanning period, the video signal VI2 is outputted when the display switching control signal SW2 is at a low level, while the graphic signal GI2 is outputted when the display switching control signal SW2 is at a high level. On the other hand, in the backward scanning period, the video signal VI2 is outputted when the display switching control signal SW2 is at a low level, while the signal at a black level is outputted when the display switching control signal SW2 is at a high level.

In the image display shown in FIG. 4, a part of the graphic signal is the signal at a black level at the time of backward scanning. Consequently, in the forward scanning period, display by the video signal VI2 as well as on-screen display by the graphic signal GI2 are performed. In the backward scanning period, display by the video signal VI2 as well as display at a black level are performed.

In this example, although resolution in the on-screen display by the graphic signal GI2 is lower than resolution in the display of the video signal, a request for the resolution in the on-screen display is not more strict than the resolution in the display of the video signal. Accordingly, no problems substantially arise.

(4) Fourth Embodiment

FIG. 6 is a block diagram showing the configuration of a principal part of an image display in a fourth embodiment of the present invention.

The image display shown in FIG. 6 comprises a video signal inverter 1a, a microcomputer 2, a CRT 3, a switching control inverter 6, a synthesizer 7, and a masking circuit 9. The configurations and the operations of the video signal inverter 1a, the microcomputer 2, the CRT 3, and the synthesizer 7 shown in FIG. 6 are the same as the configurations and the operations of the video signal inverter 1a, the microcomputer 2, the CRT 3, and the synthesizer 7 shown in FIG. 3. The configuration and the operation of the switching control inverter 6 shown in FIG. 6 are the same as the configuration and the operation of the switching control inverter 6 shown in FIG. 1.

A synthesized signal VG1 outputted from the synthesizer 7 is fed to the masking circuit 9. The masking circuit 9 masks, in a case where parts of upper and lower forward scanning lines are on-screen displayed, a corresponding part of a backward scanning line with a signal at a black level at the time of backward scanning on the basis of a display switching control signal SW2 outputted from the switching control inverter 6, and outputs a synthesized signal VG3.

The synthesized signal VG3 outputted from the masking circuit 9 is fed to the video signal inverter 1a. The video signal inverter 1a outputs the synthesized signal VG3 in a forward scanning period as it is as a display signal VO, while inverting the synthesized signal VG3 in a backward scanning period on the time axis and outputting the inverted synthesized signal VG3 as a display signal VO. The CRT 3 displays the display signal VO outputted the video signal inverter 1*a*.

In the present embodiment, the microcomputer 2 corresponds to graphic signal generating means, the synthesizer 7 corresponds to synthesizing means, the masking circuit 9 corresponds to masking means, the video signal inverter 1*a* corresponds to video signal inverting means, and the CRT 3 corresponds to display means.

In the image display shown in FIG. 6, a part of the graphic signal is a signal at a black level at the time of the backward scanning, as in the image display shown in FIG. 4. Consequently, display by the video signal as well as on-screen display by the graphic signal are performed in the forward scanning period, while display by the video signal as well as display at a black level are performed in the backward scanning period.

(5) Fifth Embodiment

Figure 7:
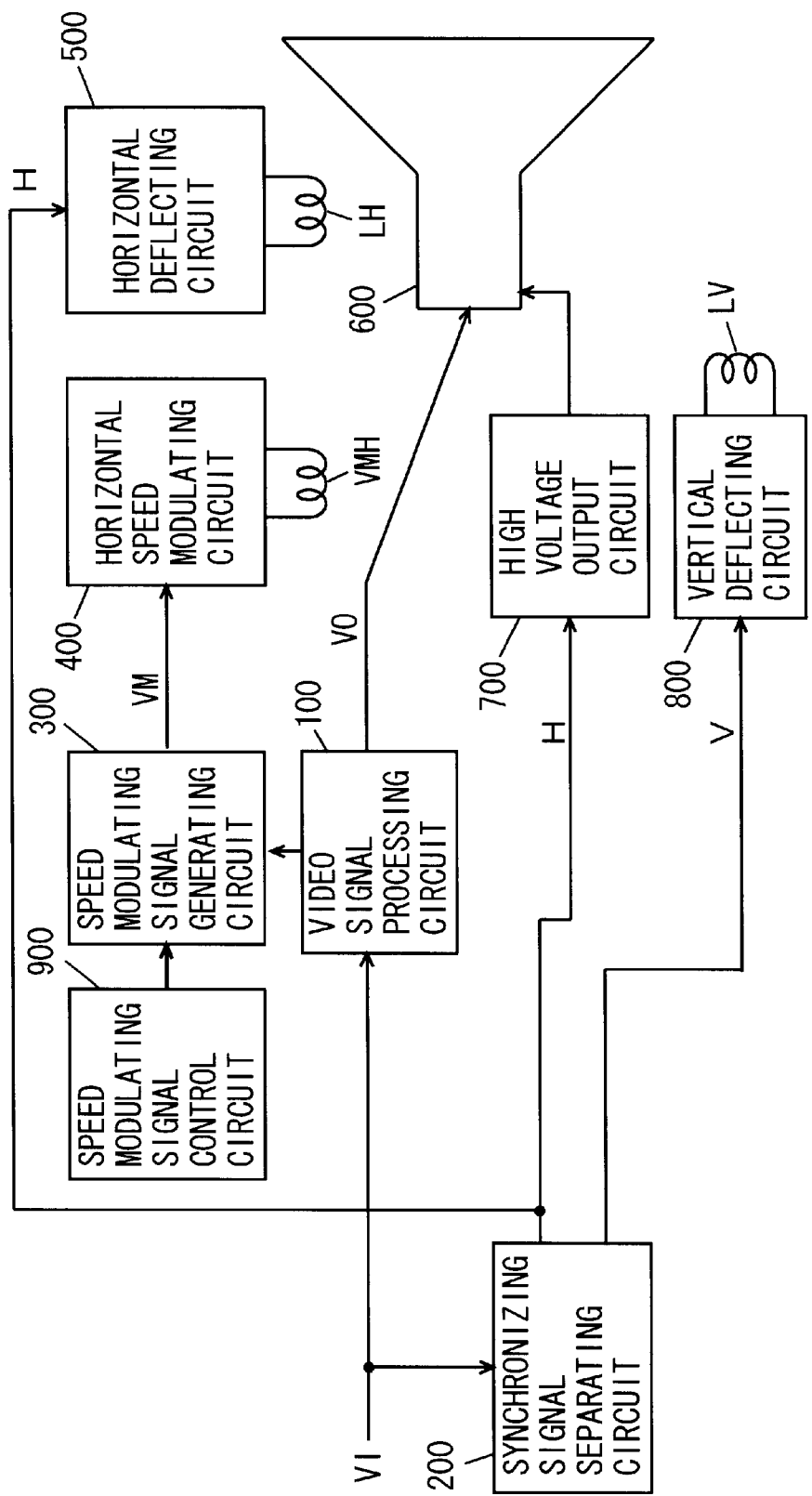
FIG. 7 is a block diagram showing the configuration of the whole of an image display according to a fifth embodiment of the present invention.

FIG. 7 is a block diagram showing the overall configuration of an image display in a fifth embodiment of the present invention.

The image display shown in FIG. 7 comprises a video signal processing circuit 100, a synchronizing signal separating circuit 200, a speed (velocity) modulating signal generating circuit 300, a horizontal speed (velocity) modulating circuit 400, a horizontal deflecting circuit 500, a CRT 600, a high voltage output circuit 700, a vertical deflecting circuit 800, and a speed (velocity) modulating signal control circuit 900. A horizontal deflecting coil LH, a horizontal speed (velocity) modulating coil VMH, and a vertical deflecting coil LV are attached to the CRT 600.

A video signal VI is fed to the video signal processing circuit 100 and the synchronizing signal separating circuit 200. The video signal processing circuit 100 generates a display signal VO from the video signal VI. The configuration and the operation of the video signal processing circuit 100 will be described later. The synchronizing signal separating circuit 200 separates a horizontal synchronizing signal H and a vertical synchronizing signal V from the video signal VI.

The horizontal deflecting circuit 500 comprises a horizontal driving circuit, a horizontal output circuit, a distortion correcting circuit, a linearity correcting circuit, and an S-shaped capacitor. The horizontal deflecting circuit 500 feeds a saw tooth horizontal deflecting current for deflecting an electron beam in the horizontal direction in the CRT 600 to the horizontal deflecting coil LH in synchronization with the horizontal synchronizing signal H outputted from the synchronizing signal separating circuit 200.

The speed modulating signal generating circuit 300 generates a speed (velocity) modulating signal VM on the basis of the display signal VO outputted from the video signal processing circuit 100. The configuration and the operation of the speed modulating signal generating circuit 300 will be described later. The speed modulating signal control circuit 900 controls the speed modulating signal VM generated by the speed modulating signal generating circuit 300. The configuration and the operation of the speed modulating signal control circuit 900 will be described later.

The horizontal speed modulating circuit 400 comprises a pre-driving circuit, a horizontal speed modulation driving circuit, and so forth, and feeds a horizontal speed (velocity) modulating current for modulating the speed of the electron beam in the horizontal direction in the CRT 600 to the horizontal speed modulating coil VMH on the basis of the speed modulating signal VM outputted from the speed modulating signal generating circuit 300, and performs horizontal contour correction.

The high voltage output circuit 700 comprises a high voltage driving circuit, a flyback transformer, a dynamic automatic focusing control circuit, and a dynamic automatic focusing output circuit, and applies a high voltage to the CRT 600 in order to carry out focusing control or the like.

The vertical deflecting circuit 800 comprises a vertical output circuit, and feeds all saw tooth vertical deflecting current for deflecting the electron beam in the vertical direction in the CRT 600 to the vertical deflecting coil LV in synchronization with the vertical synchronizing signal V outputted from the synchronizing signal separating circuit 200.

Figure 8:
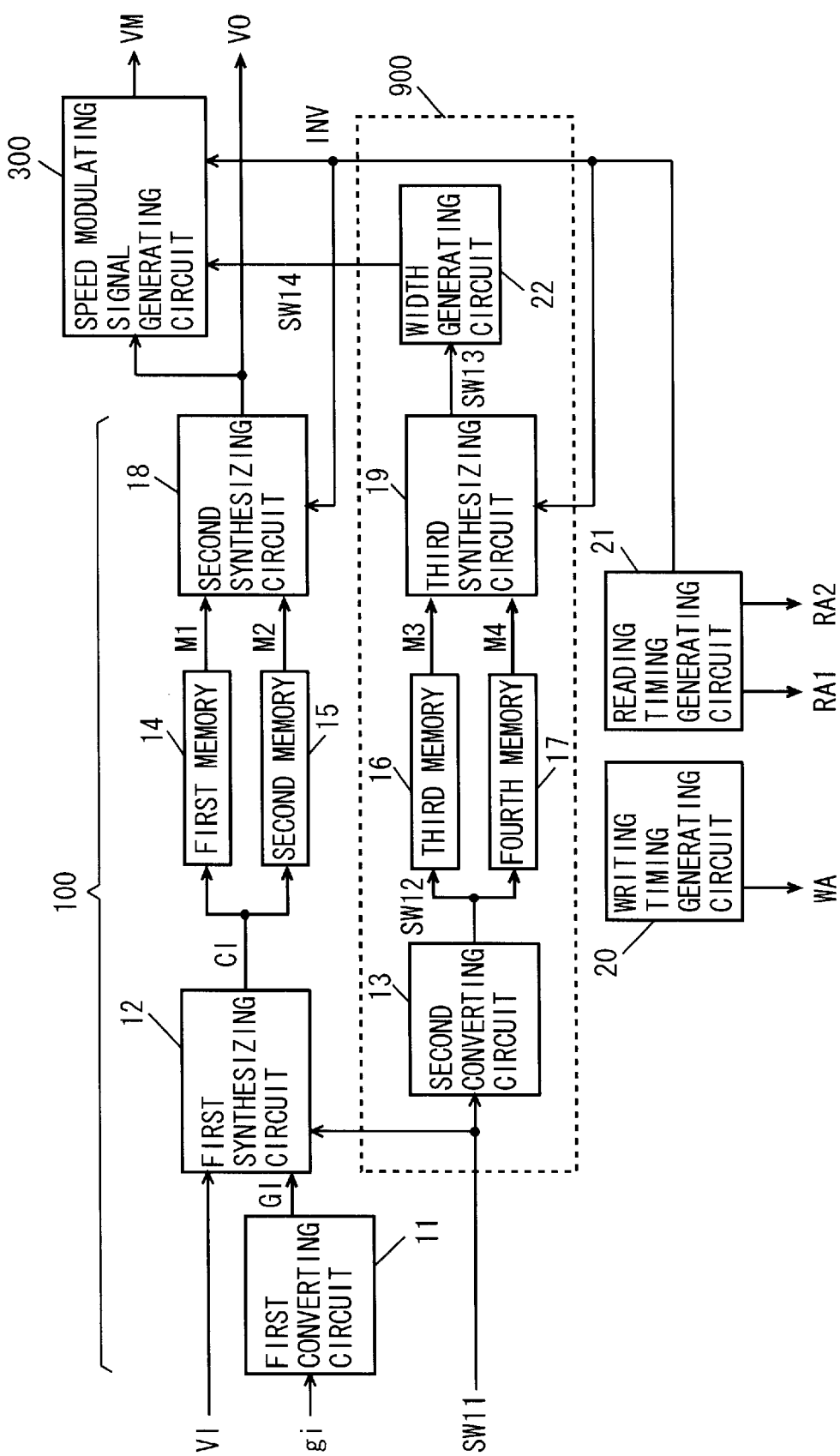
FIG. 8 is a block diagram showing the configuration of a video signal processing circuit, a speed modulating signal generating circuit and a speed modulating signal control circuit shown in FIG. 7.
Figure 9:
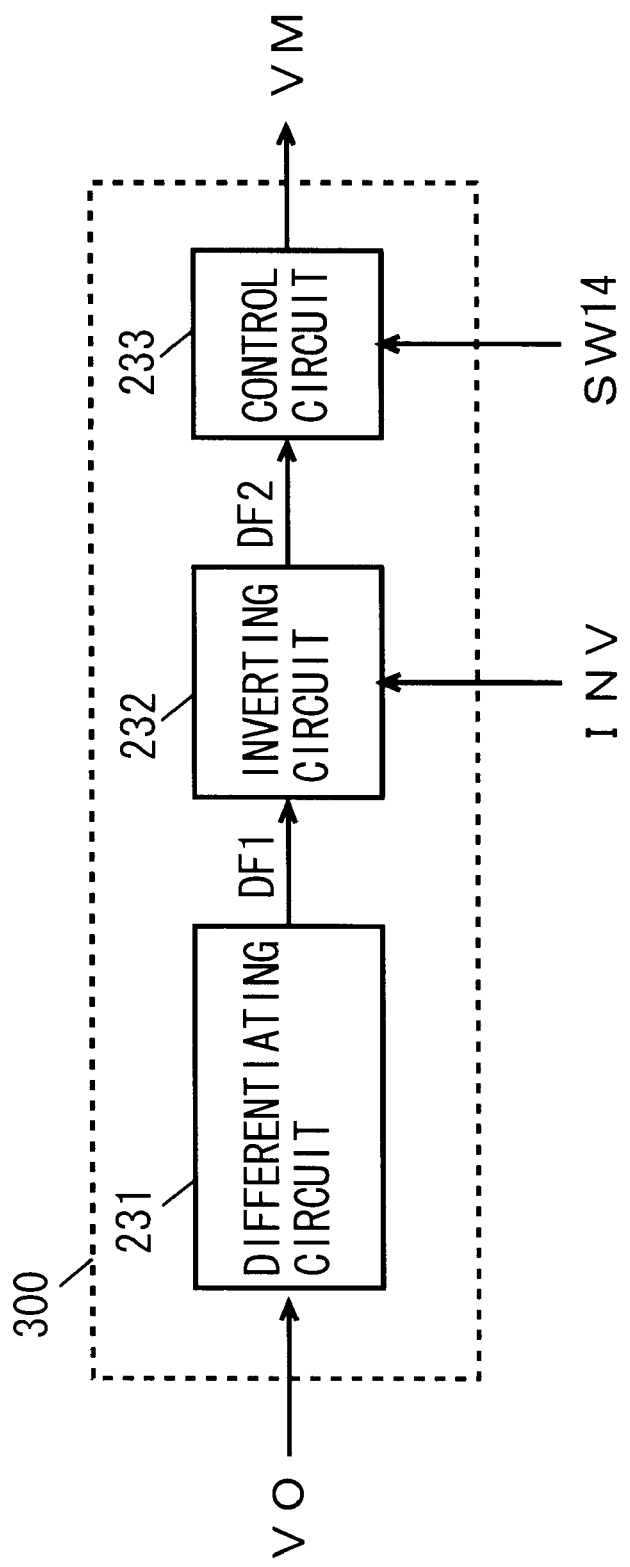
FIG. 9 is a block diagram showing the configuration of the speed modulating signal generating circuit shown in FIG. 8.

FIG. 8 is a block diagram showing the configurations of the video signal processing circuit 100, the speed modulating signal generating circuit 300, and the speed modulating signal control circuit 900 shown in FIG. 7. FIG. 9 is a block diagram showing the configuration of the speed modulating signal generating circuit 300 shown in FIG. 8.

The video signal processing circuit 100 shown in FIG. 8 comprises a first converting circuit 11, a first synthesizing circuit 12, first and second memories 14 and 15, a second synthesizing circuit 18, a writing timing generating circuit 20, and a reading timing generating circuit 21. The speed modulating signal control circuit 900 comprises a second converting circuit 13, third and fourth memories 16 and 17, a third synthesizing circuit 19, and a width generating circuit 22. The writing timing generating circuit 20 and the reading timing generating circuit 21 are common between the video signal processing circuit 100 and the speed modulating signal control circuit 900.

The first converting circuit 11 converts the format of a graphic signal (character signal) gi into the format of the video signal VI, and outputs the graphic signal GI. The first synthesizing circuit 12 switches the video signal VI and the graphic signal GI outputted from the first converting circuit 11 on the basis of a display switching control signal SW11, and outputs a synthesized signal CI.

The second converting circuit 13 changes the display switching control signal SW11 into one bit (binarization), and outputs a 1-bit display switching control signal SW12.

The first and second memories 14 and 15 perform inversion processing for inverting the synthesized signal CI outputted from the first synthesizing circuit 12 on the time axis for each of a forward scanning period and a backward scanning period, and respectively output synthesized signals M1 and M2.

The third and fourth memories 16 and 17 perform inversion processing for inverting the display switching control signal SW12 outputted from the second converting circuit 13 on the time axis for each of the forward scanning period and the backward scanning period, and respectively output display switching control signals M3 and M4.

The second synthesizing circuit 18 synthesizes the synthesized signal M1 outputted from the first memory 14 and the synthesized signal M2 outputted from the second memory 15, and outputs a display signal VO.

The third synthesizing circuit 19 synthesizes the display switching control signal M3 outputted from the third memory 16 and the display switching control signal M4 outputted from the fourth memory 17, and outputs a display switching control signal SW13.

The writing timing generating circuit 20 feeds a writing timing signal to the first to fourth memories 14, 15, 16, and 17, and feeds a writing address signal WA to the first to fourth memories 14, 15, 16, and 17.

The reading timing generating circuit 21 feeds a reading timing signal to the first to fourth memories 14, 15, 16, and 17, and feeds a first reading address signal RA1 to the first and third memories 14 and 16 and feeds a second reading address signal RA2 to the second and fourth memories 15 and 17. Further, the reading timing generating circuit 21 feeds an inversion identifying signal INV to the second and third synthesizing circuits 18 and 19, as well as the speed modulating signal generating circuit 300.

The width generating circuit 22 expands the pulse width of the display switching control signal SW13 outputted from the third synthesizing circuit 19, and feeds a display switching control signal SW14 to the speed modulating signal generating circuit 300.

As shown in FIG. 9, the speed modulating signal generating circuit 300 comprises a differentiating circuit 231, an inverting circuit 232, and a control circuit 233.

The differentiating circuit 231 subjects the display signal VO to first-order differentiation, and outputs a differentiated signal DF1. The inverting circuit 232 inverts the polarity of the differentiated signal DF1 on the basis of the inversion identifying signal INV fed from the reading timing generating circuit 21, and outputs a differentiated signal DF2. The control circuit 233 generates a speed modulating signal VM from the differentiated signal DF2 on the basis of the display switching control signal SW14 fed from the width generating circuit 22.

In the present embodiment, the video signal processing circuit 100 corresponds to synthesizing and inverting means, the CRT 600 corresponds to display means, the speed modulating signal generating circuit 300 corresponds to horizontal speed modulating signal generating means, the horizontal speed modulating circuit 400 and the horizontal speed modulating coil VMH correspond to horizontal speed modulating means, and the speed modulating signal control circuit 900 corresponds to horizontal speed modulating signal control means. The first synthesizing circuit 12 corresponds to first synthesizing means, the first and second memories 14 and 15 and the second synthesizing circuit 18 correspond to video signal inverting means, the third and fourth memories 16 and 17 and the third synthesizing circuit 19 correspond to switching signal inverting means, and the control circuit 233 corresponds to control means. Further, the width generating circuit 22 corresponds to pulse width expanding means, and the second converting circuit 13 corresponds to binarizing means. The first memory 14 corresponds to first storing means, the second memory 15 corresponds to second storing means, the second synthesizing circuit 18 corresponds to second synthesizing means, the third memory 16 corresponds to third storing means, the fourth memory 17 corresponds to fourth storing means, and the third synthesizing circuit 19 corresponds to third synthesizing means. The first converting circuit 11 corresponds to format converting means.

FIGS. 10 and 11 are waveform diagrams for explaining the operation of the image display shown in FIG. 8. FIG. 12 is a waveform diagram for explaining the operation of the second converting circuit 13 shown in FIG. 8. Referring now to the waveform diagrams of FIGS. 10, 11, and 12, the operation of the image display shown in FIG. 8 will be described.

In FIG. 8, the graphic signal gi is fed from a microcomputer (not shown) to the first converting circuit 11. In the first converting circuit 11, the format of the graphic signal gi is converted into the format of the video signal VI, and the graphic signal GI is outputted, as shown in FIG. 10. For example, when the video signal VI is composed of a luminance signal (Y) and chrominance difference signals (Pb) and (Pr), and the graphic signal gi is composed of an RGB (Red, Green, Blue) signal, the graphic signal gi is converted into a luminance signal and a chrominance difference signal from the RGB signal by the first converting circuit 11.

In the first synthesizing circuit 12, the video signal VI and the graphic signal GI are synthesized by methods such as weighted average on the basis of the display switching control signal SW11, and the synthesized signal CI is outputted, as shown in FIG. 10.

The synthesized signal CI outputted from the first synthesizing circuit 12 is simultaneously written into the first and second memories 14 and 15 in a predetermined order on the basis of the writing address signal WA outputted from the writing timing generating circuit 20. The writing of the synthesized signal CI into the first and second memories 14 and 15 is controlled by the writing timing signal outputted from the writing timing generating circuit 20.

In the example shown in FIG. 10, the writing address signal WA which successively increases from 0 to 767 is fed to the first and second memories 14 and 15.

The synthesized signal stored in the first memory 14 is read out in the same order as that at the time of the writing on the basis of the first reading address signal RA1 outputted from the reading timing generating circuit 21. The synthesized signal stored in the second memory 15 is read out in an order reverse to that at the time of the writing on the basis of the second reading address signal RA2 outputted from the reading timing generating circuit 21. The reading of the synthesized signal from the first and second memories 14 and 15 is controlled by the reading timing signal outputted from the reading timing generating circuit 21.

In the example shown in FIG. 10, the first reading address signal RA1 which successively increases from 0 to 767 is fed to the first memory 14, and the second reading address signal RA2 which successively decrease from 767 to 0 is fed to the second memory 15.

The synthesized signal M1 shown in FIG. 10 which is delayed by one horizontal scanning period from the synthesized signal CI is thus outputted form the first memory 14. On the other hand, the synthesized, signal M2 shown in FIG. 10 which is delayed by one horizontal scanning period from the synthesized signal CI and is inverted on the time axis is outputted from the second memory 15.

The synthesized signal M2 corresponding to the backward scanning is thus inverted on the time axis, thereby making it possible to display a video signal and a graphic signal in bidirectional deflection.

In the second synthesizing circuit 18, the synthesized signal M1 outputted from the first memory 14 and the synthesized signal M2 outputted from the second memory 15 are then synthesized on the basis of the inversion identifying signal INV shown in FIG. 10 outputted from the reading timing generating circuit 21, and the display signal VO is outputted, as shown in FIG. 11. In the present embodiment, the synthesized signal M1 outputted from the first memory 14 is selected when the inversion identifying signal INV is at a high level, while the synthesized signal M2 outputted from the second memory 15 is selected when the inversion identifying signal INV is at a low level.

On the other hand, in the second converting circuit 13, the display switching control signal SW11 is binarized by being compared with the predetermined reference level LV, so that the 1-bit display switching control signal SW12 is outputted, as shown in FIG. 12. In the example shown in FIG. 12, the display switching control signal SW12 enters a low level when the level of the display switching control signal SW11 is lower than the reference level LV, while entering a high level when the level of the display switching control signal SW11 is higher than the reference level LV.

The display switching control signal SW12 outputted from the second converting circuit 13 is simultaneously written into the third and fourth memories 16 and 17 in a predetermined order on the basis of the writing address signal WA outputted from the writing timing generating circuit 20. The writing of the display switching control signal SW12 into the third and fourth memories 16 and 17 is controlled by the writing timing signal outputted from the writing timing generating circuit 20.

In the example shown in FIG. 10, the writing address signal WA which successively increase from 0 to 767 is fed to the third and fourth memories 16 and 17.

The display switching control signal stored in the third memory 16 is read out in the same order as that at the time of the writing on the basis of the first reading address signal RA1 shown in FIG. 10 which is outputted from the reading timing generating circuit 21. The display switching control signal stored in the fourth memory 17 is read out in an order reverse to that at the time of the writing on the basis of the second reading address signal RA2 shown in FIG. 10 which is outputted from the reading timing generating circuit 21. The reading of the display switching control signal from the third and fourth memories 16 and 17 is controlled by the reading timing signal outputted from the reading timing generating circuit 21.

In the example shown in FIG. 10, the first reading address signal RA1 which successively increases from 0 to 767 is fed to the third memory 16, and the second reading address signal RA2 which successively decreases from 767 to 0 is fed to the fourth memory 17.

The display switching control signal M3 shown in FIG. 11 which is delayed by one horizontal scanning period from the display switching control signal SW12 shown in FIG. 10 is thus outputted from the third memory 16. The display switching control signal M4 shown in FIG. 11 which is delayed by one horizontal scanning period from the display switching control signal SW12 shown in FIG. 10 and is inverted on the time axis is outputted from the fourth memory 17.

In the third synthesizing circuit 19, the display switching control signal M3 outputted from the third memory 16 and the display switching control signal M4 outputted from the fourth memory 17 are synthesized on the basis of the inversion identifying signal INV outputted from the reading timing generating circuit 21, and the display switching control signal SW13 is outputted, as shown in FIG. 11.

The display switching control signal M3 outputted from the third memory 16 is selected when the inversion identifying signal INV is at a level, while the display switching control signal M4 outputted from the fourth memory 17 is selected when the inversion identifying signal INV is at a low level.

The pulse width of the display switching control signal SW13 outputted from the third synthesizing circuit 19 is then expanded in the width generating circuit 22, so that the display switching control signal SW14 is outputted, as shown in FIG. 11.

In the differentiating circuit 231 in the speed modulating signal generating circuit 300 shown in FIG. 9, a first-order differential of the display signal VO which has been outputted from the second synthesizing circuit 18 is calculated, and the differentiated signal DF1 is outputted. Further, in the inverting circuit 232, the polarity of the differentiated signal DF1 corresponding to the backward scanning period is inverted on the basis of the inversion identifying signal INV, and the differentiated signal DF2 is outputted. In the control circuit 233, a portion corresponding to a character portion of the differentiated signal DF2 is controlled at a predetermined level on the basis of the display switching control signal SW14, and the speed modulating signal VM is outputted, as shown in FIG. 11. In the present embodiment, when the display switching control signal SW14 is at a high level, the differentiated signal DF2 is set at a zero level.

For example, the horizontal scanning speed is increased when the speed modulating signal VM is positive, while being decreased when the speed modulating signal VM is negative. As described above, the speed modulating signal VM in a backward path is inverted on the time axis by inverting the video signal on the time axis and inverting the polarity of the differentiated signal. Consequently, horizontal speed modulation is also performed in the backward scanning.

The width generating circuit 22 shown in FIG. 8 controls the pulse width of the display switching control signal SW14 depending on the frequency band of the differentiated signal DF1 outputted from the differentiating circuit 231 shown in FIG. 9. Consequently, a portion, corresponding to the graphic signal, in the speed modulating signal VM is reliably set at a zero level.

According to the image display shown in FIG. 8, the graphic signal is inverted on the time axis in the backward scanning, so that on-screen display possible in display of the video signal by the bidirectional deflection, and the speed modulating signal VM is invert on the time axis in the backward scanning, so that horizontal speed modulation is possible. Consequently, the image quality is improved.

When the graphic signal is subjected to the horizontal speed modulation, a black part of an on-screen display looks thick, and a white part thereof looks thin. Consequently, the balance of the character portion is degraded, thereby degrading the image quality. In the image display shown in FIG. 8, a portion, corresponding to the graphic signal, in the speed modulating signal VM is controlled at a predetermined level, so that the on-screen display is not subjected to the horizontal speed modulation. Consequently, the image quality of the character portion is prevented from being degraded.

Although in the above-mentioned embodiment, the first and third memories 14 and 16 are separately provided, and the second and fourth memories 15 and 17 are separately provided, it is also possible to constitute the first and third memories 14 and 16 by one memory, store the synthesized signal CI and the display switching control signal SW12 at the same address, constitute the second and fourth memories 15 and 17 by another one memory, and store the synthesized signal CI and the display switching control signal SW12 at the same address. Consequently, the number of memories can be reduced.

INDUSTRIAL APPLICABILITY

As described in the foregoing, an image display and a horizontal speed modulator according to the present invention can be suitably used for a monitor apparatus, a television receiver, and so forth for a horizontal bidirectional modulation system display which displays a highly precise image.

What is claimed is:

1. An image display for displaying an image by forward scanning and backward scanning, comprising:

inverting means for inverting on the time axis a video signal and a graphic signal which correspond to the backward scanning;

switching and outputting means for switching and outputting the video signal and the graphic signal which correspond to the forward scanning and switching and outputting the video signal and the graphic signal, which have been inverted, corresponding to the backward scanning; and display means for displaying the video signal and the graphic signal which have been outputted by the forward scanning and the backward scanning.

2. An image display for displaying an image by forward scanning and backward scanning, comprising:

video signal inverting means for alternately inverting the output order of an inputted video signal between the forward scanning and the backward scanning;

graphic signal generating means for generating a graphic signal;

graphic signal inverting means for alternately inverting the output order of the graphic signal generated by said graphic signal generating means between the forward scanning and the backward scanning;

display signal switching means for switching the display of the video signal outputted from said video signal inverting means and the graphic signal outputted from said graphic signal inverting means;

switching and inverting means for alternately inverting the order of switching by said display signal switching means between the forward scanning and the backward scanning; and display means for displaying the video signal and the graphic signal which are outputted from said display signal switching means by the forward scanning and the backward scanning.

3. An image display for displaying an image by forward scanning and backward scanning, comprising:

synthesizing means for synthesizing a video signal and a graphic signal which correspond to the forward scanning and the backward scanning;

inverting means for inverting on the time axis the video signal and the graphic signal, which have been synthesized, corresponding to the backward scanning; and display means for displaying by the forward scanning the video signal and the graphic signal, which have been synthesized, corresponding to the forward scanning, and displaying by the backward scanning the video signal and the graphic signal, which have been inverted, corresponding to the backward scanning.

4. An image display for displaying an image by forward scanning and backward scanning, comprising:

graphic signal generating means for generating a graphic signal;

synthesizing means for synthesizing an inputted video signal and the graphic signal outputted from the graphic signal generating means;

video signal inverting means for alternately inverting the output order of the video signal and the graphic signal which have been synthesized by said synthesizing means between the forward scanning and the backward scanning; and display means for displaying the video signal and the graphic signal which are outputted from said video signal inverting means by the forward scanning and the backward scanning.

5. An image display for displaying an image by forward scanning and backward scanning, comprising:

inverting means for inverting on the time axis a video signal corresponding to the backward scanning;

switching and outputting means for switching and outputting the video signal and the graphic signal which correspond to the forward scanning;

masking means for masking a portion, corresponding to a displayed portion of the graphic signal in the upper or lower forward scanning, in the video signal corresponding to the backward scanning; and display means for displaying by the forward scanning the video signal and the graphic signal which correspond to the forward scanning, and displaying by the backward scanning the video signal, which has been partially masked, corresponding to the backward scanning.

6. An image display for displaying an image by forward scanning and backward scanning, comprising:

video signal inverting means for alternately inverting the output order of an inputted video signal by the forward scanning and the backward scanning;

graphic signal generating means for generating a graphic signal;

display signal switching means for switching the display of the video signal outputted from said video signal inverting means and the graphic signal outputted from said graphic signal generating means as well as masking a portion, corresponding to a displayed portion of the graphic signal in the upper or lower forward scanning, in the video signal corresponding to the backward scanning with a mask signal generated by said graphic signal generating means;

switching and inverting means for alternately inverting the order of switching by said display signal switching means between the forward scanning and the backward scanning; and display means for displaying by the forward scanning the video signal and the graphic signal which are outputted from said display signal switching means, and displaying by the backward scanning the video signal and the mask signal which are outputted from said display signal switching means.

7. An image display for displaying an image by forward scanning and backward scanning, comprising:

synthesizing means for synthesizing a video signal and a graphic signal which correspond to the forward scanning and the backward scanning;

masking means for masking a portion, corresponding to a displayed portion of the graphic signal in the upper or lower forward scanning, in the video signal corresponding to the backward scanning;

inverting means for inverting on the time axis the video signal, which has been partially masked, corresponding to the backward scanning; and display means for displaying by the forward scanning the video signal and the graphic signal which correspond to the forward scanning, and displaying by the backward scanning the video signal, which has been partially masked, corresponding to the backward scanning.

8. An image display for displaying an image by forward scanning and backward scanning, comprising:

graphic signal generating means for generating a graphic signal;

synthesizing means for synthesizing an inputted video signal and the graphic signal outputted from the graphic signal generating means;

masking means receiving the video signal and the graphic signal which have been synthesized by said synthesizing means, and masking a portion, corresponding to a displayed portion of the graphic signal in the upper or lower forward scanning, in the video signal corresponding to the backward scanning and outputting the video signal and the graphic signal;

video signal inverting means for alternately inverting the output order of the video signal and the graphic signal which are outputted from said masking means between the forward scanning and the backward scanning; and display means for displaying by the forward scanning the video signal and the graphic signal, corresponding to the forward scanning, which are outputted from said video signal inverting means, and displaying by the backward scanning the video signal, which has been partially masked, outputted from said video signal inverting means.

9. An image display for displaying an image by forward scanning and backward scanning, comprising:

inverting means for alternately inverting the output order of a video signal and a graphic signal between the forward scanning and the backward scanning while synthesizing the video signal and the graphic signal;

display means for displaying the video signal and the graphic signal which have been outputted by the forward scanning and the backward scanning;

generating means for generating a horizontal speed modulating signal by differentiating the video signal and the graphic signal which have been outputted; and horizontal speed modulating means for performing horizontal speed modulation on the basis of the generated horizontal speed modulating signal.

10. The image display according to claim 9, further comprising level control means for controlling a portion, corresponding to the graphic signal, in the horizontal speed modulating signal generated by said generating means at a predetermined level.

11. An image display for displaying an image by forward scanning and backward scanning, comprising:

synthesizing and inverting means for alternately inverting the output order of the video signal and the graphic signal which are inputted between the forward scanning and the backward scanning while synthesizing the video signal and the graphic signal;

display means for displaying the video signal and the graphic signal which are outputted from said synthesizing and inverting means by the forward scanning and the backward scanning;

horizontal speed modulating signal generating means for differentiating the video signal and the graphic signal which are outputted from said synthesizing and inverting means to generate a horizontal signal modulating signal; and horizontal speed modulating means for performing horizontal speed modulation on the basis of the horizontal speed modulating signal outputted from said horizontal speed modulating signal generating means.

12. The image display according to claim 11, wherein said horizontal speed modulating signal generating means comprises differentiating means for differentiating the video signal and the graphic signal which are outputted from said synthesizing and inverting means, and polarity inverting means for alternately inverting the polarity of an output signal of said differentiating means between the forward scanning and the backward scanning.

13. The image display according to claim 11, further comprising horizontal speed modulating signal control means for controlling a portion, corresponding to the graphic signal, in the horizontal speed modulating signal generated by said horizontal speed modulating signal generating means.

14. The image display according to claim 13, wherein said horizontal speed modulating signal control means sets the portion, corresponding to the graphic signal, in the horizontal speed modulating signal generated by said horizontal speed modulating signal generating means at a predetermined level.

15. The image display according to claim 13, wherein said synthesizing and inverting means comprises first synthesizing means for switching and outputting the video signal and the graphic signal on the basis of a switching signal having a pulse corresponding to the position where the graphic signal is displayed, to synthesize the video signal and the graphic signal, and video signal inverting means for alternately inverting the output order of the video signal and the graphic signal which have been synthesized by said first synthesizing means between the forward scanning and the backward scanning, said horizontal speed modulating signal control means comprises switching signal inverting means for alternately inverting said switching signal on the time axis between the forward scanning and the backward scanning, and control means for controlling a portion, corresponding to the graphic signal, in the horizontal speed modulating signal generated by said horizontal speed modulating signal generating means on the basis of the switching signal which has been inverted by said switching signal inverting means.

16. The image display according to claim 15, wherein said horizontal speed modulating signal control means further comprises pulse width expanding means for expanding the width of said pulse of the switching signal which has been inverted by said switching signal inverting means.

17. The image display according to claim 16, wherein said pulse width expanding means controls the amount of expansion of the width of the pulse of said switching signal depending on the frequency band of the horizontal speed modulating signal generated by said horizontal speed modulating signal generating means.

18. The image display according to claim 15, further comprising binarizing means for binarizing said switching signal and feeding the binarized switching signal to said switching signal inverting means.

19. The image display according to claim 15, wherein said video signal inverting means comprises first storing means for inputting and storing the video signal and the graphic signal, corresponding to the forward scanning, which have been outputted from said first synthesizing means as well as outputting the video signal and the graphic signal which have been stored in the same order as that at the time of the input, second storing means for inputting in a predetermined order and storing the video signal and the graphic signal, corresponding to the backward scanning, which have been outputted from said first synthesizing means as well as outputting the video signal and the graphic signal which have been stored in an order reverse to that at the time of the input, and second synthesizing means for synthesizing the video signal and the graphic signal which are outputted from said first storing means and the video signal and the graphic signal which are outputted from said second storing means, said switching signal inverting means comprises third storing means for inputting and storing the switching signal corresponding to the forward scanning in a predetermined order as well as outputting the stored switching signal in the same order as that at the time of the input, fourth storing means for inputting in a predetermined order and storing the switching signal corresponding to the backward scanning as well as outputting the stored switching signal in an order reverse to that at the time of the input, and third synthesizing means for synthesizing the switching signal outputted from said third storing means and the switching signal outputted from said fourth storing means.

20. The image display according to claim 8, further comprising format converting means for converting the format of the inputted graphic signal into the format of the inputted video signal.

21. A horizontal speed modulator used for an image display for displaying an image by forward scanning and backward scanning, comprising:

synthesizing and inverting means for alternately inverting the output order of a video signal and a graphic signal which are inputted between the forward scanning and the backward scanning while synthesizing the video signal and the graphic signal;

horizontal speed modulating signal generating means for differentiating the video signal and the graphic signal which are outputted from said synthesizing and inverting means, to generate a horizontal speed modulating signal;

horizontal speed modulating means for performing horizontal speed modulation on the basis of the horizontal speed modulating signal outputted from said horizontal speed modulating signal generating means; and horizontal speed modulating signal control means for controlling a portion, corresponding to the graphic signal, in the horizontal speed modulating signal generated by said horizontal speed modulating signal generating means.

22. The horizontal speed modulator according to claim 1, wherein said horizontal speed modulating signal generating means comprises differentiating means for differentiating the video signal and the graphic signal which are outputted from said synthesizing and inverting means, and polarity inverting means for alternately inverting the polarity of an output signal of said differentiating means between the forward scanning and the backward scanning.

23. The horizontal speed modulator according to claim 21, wherein said horizontal speed modulating signal control means sets a portion, corresponding to the graphic signal, in the horizontal speed modulating signal generated by said horizontal speed modulating signal generating means at a predetermined level.

24. The horizontal speed modulator according to claim 21, wherein said synthesizing and inverting means comprises synthesizing means for switching and outputting the video signal and the graphic signal on the basis of a switching signal having a pulse corresponding to the position where the graphic signal is displayed, to synthesize the video signal and the graphic signal, and video signal inverting means for alternately inverting the output order of the video signal and the graphic signal which have been synthesized by said synthesizing means between the forward scanning and the backward scanning, said horizontal speed modulating signal control means comprises switching signal inverting means for alternately inverting said switching signal on the time axis between the forward scanning and the backward scanning, and control means for controlling a portion, corresponding to the graphic signal, in the horizontal speed modulating signal generated by said horizontal speed modulating signal generating means on the basis of the switching signal which has been inverted by said switching signal inverting means.

25. The horizontal speed modulator according to claim 24, wherein said horizontal speed modulating signal control means further comprises pulse width expanding means for expanding the width of said pulse of the switching signal which has been inverted by said switching signal inverting means.

* * * * *